United States Patent [19]

Wu

[11] Patent Number: 6,053,520
[45] Date of Patent: Apr. 25, 2000

[54] BICYCLE PEDAL CRANK MOUNTING ARRANGEMENT

[76] Inventor: Chun-Sheng Wu, 14/F., No. 152, Mei-Tsun Rd., Sec. 2, Taichung City, Taiwan

[21] Appl. No.: 09/110,480

[22] Filed: Jul. 7, 1998

[51] Int. Cl.[7] .................................................. B62M 1/99
[52] U.S. Cl. ......................... 280/259; 280/217; 74/594.1
[58] Field of Search ................................... 280/259, 217, 280/260, 261; 74/594.1, 594.2

[56] References Cited

U.S. PATENT DOCUMENTS

| | | | |
|---|---|---|---|
| 667,053 | 1/1901 | Allman | 74/594.2 |
| 709,934 | 9/1902 | Spence | 74/594.2 |
| 5,566,589 | 10/1996 | Buck | 74/594.1 |
| 5,816,600 | 10/1998 | Matsuura | 280/259 |

FOREIGN PATENT DOCUMENTS

| | | | |
|---|---|---|---|
| 4113833 | 10/1992 | Germany | 280/259 |
| 1699855 | 12/1991 | U.S.S.R. | 280/259 |

*Primary Examiner*—Daniel G. DePumpo
*Attorney, Agent, or Firm*—Rosenberg, Klein & Lee

[57] ABSTRACT

A bicycle pedal crank mounting arrangement in which two wheel boards are fixedly fastened to two opposite ends of a bottom bracket bearing axle of a bicycle, two flat-plate counter weights are respectively fixedly fastened to the wheel boards at an eccentric location in reversed directions, and two pedal assemblies are respectively fastened to the flat-plate counter weights for pedaling by legs to rotate the wheel boards, the bottom bracket bearing axle and the chain wheel being mounted on the bottom bracket bearing axle.

2 Claims, 5 Drawing Sheets

BICYCLE PEDAL CRANK MOUNTING ARRANGEMENT

BACKGROUND OF THE INVENTION

The present invention relates to bicycles, and more specifically to the mounting arrangement of the pedal cranks for a bicycle which enables the user to propel the bicycle efficiently with less effort.

In a regular bicycle, a bottom bracket bearing axle 11' is revolvably supported in a bottom bracket at the bottom side of the frame 10', a chain wheel 12' is mounted on one end of the bottom bracket bearing axle 11', a chain 14' is mounted on the chain wheel 12' and a sprocket wheel 13', and two pedal assemblies 15' are respectively connected to the ends of the bottom bracket bearing axle 11'. Each pedal assembly 15' comprises a crank 16' and a pedal 17'. This crank mounting arrangement is not satisfactory in function. Because the cranks 16' of the pedal assemblies 15' are respectively fixedly connected to the ends of the bottom bracket bearing axle 11', the arm of force is limited, and the user must employ much effort to the pedals 17' when pedaling the pedal assemblies 15'.

SUMMARY OF THE INVENTION

The present invention has been accomplished to provide a bicycle pedal crank mounting arrangement which enables the user to pedal the pedal assembly efficiently with less effort. According to one aspect of the invention, the cranks of the pedal assemblies are symmetrically eccentrically coupled to two wheel boards at the ends of the bottom bracket bearing axle. Because the arm of force is relatively increased, the user can pedal the pedal assemblies to rotate the bottom bracket bearing axle with less effort. According to another aspect of the present invention, flat-plate counter weights are fixedly connected between the wheel boards and the cranks of the pedal assemblies. The flat-plate counter weight accelerate the speed of rotation of the respective wheel board when the crank of the respective pedal assembly is turned downwards from the up stroke to the down stroke.

DETAILED DESCRIPTION OF THE PREFERRED EMBODIMENT

Figure 1:
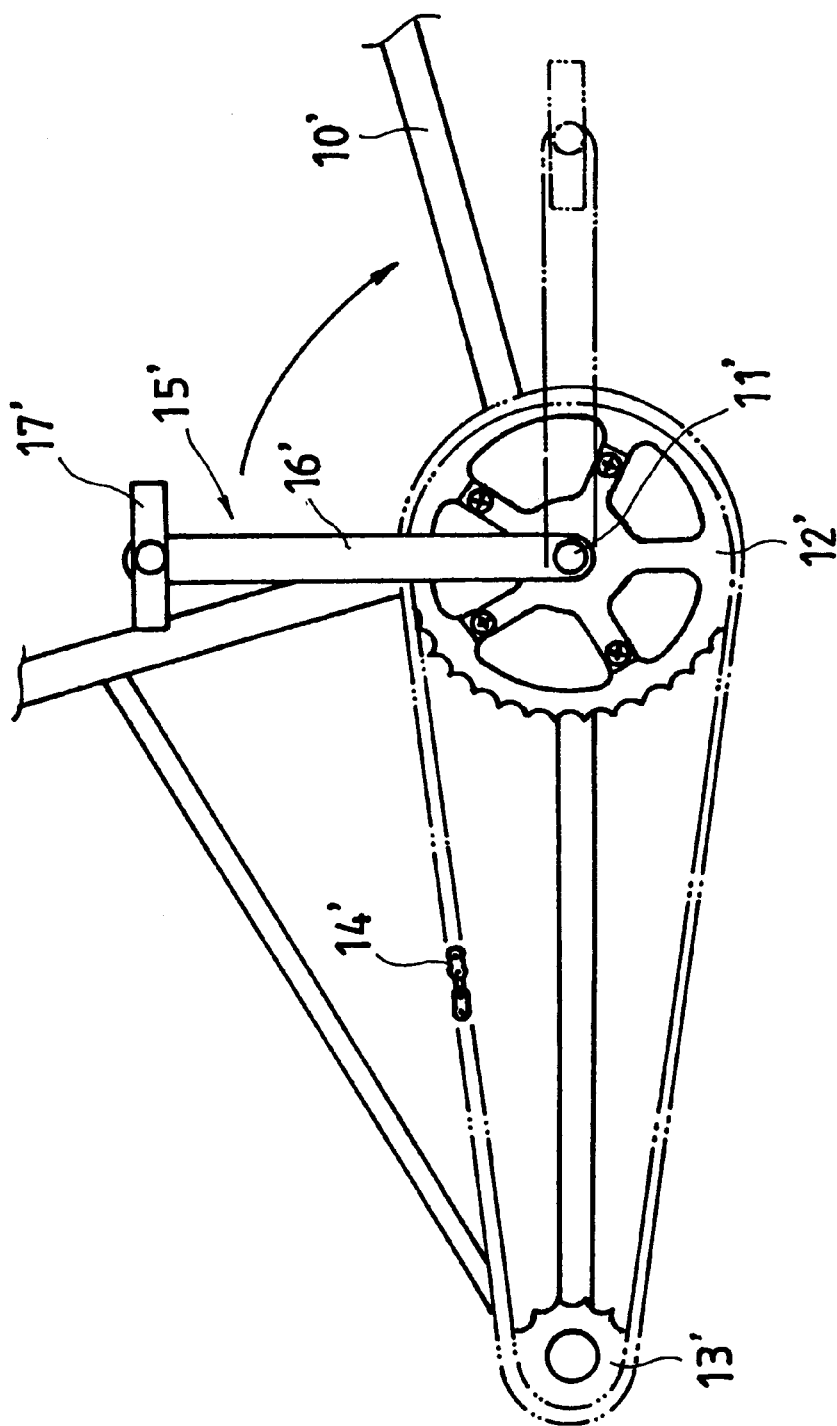
FIG. 1 shows the arrangement of the chain wheel, the chain, the bottom bracket bearing axle and the pedal assembly of a conventional bicycle.
Figure 2:
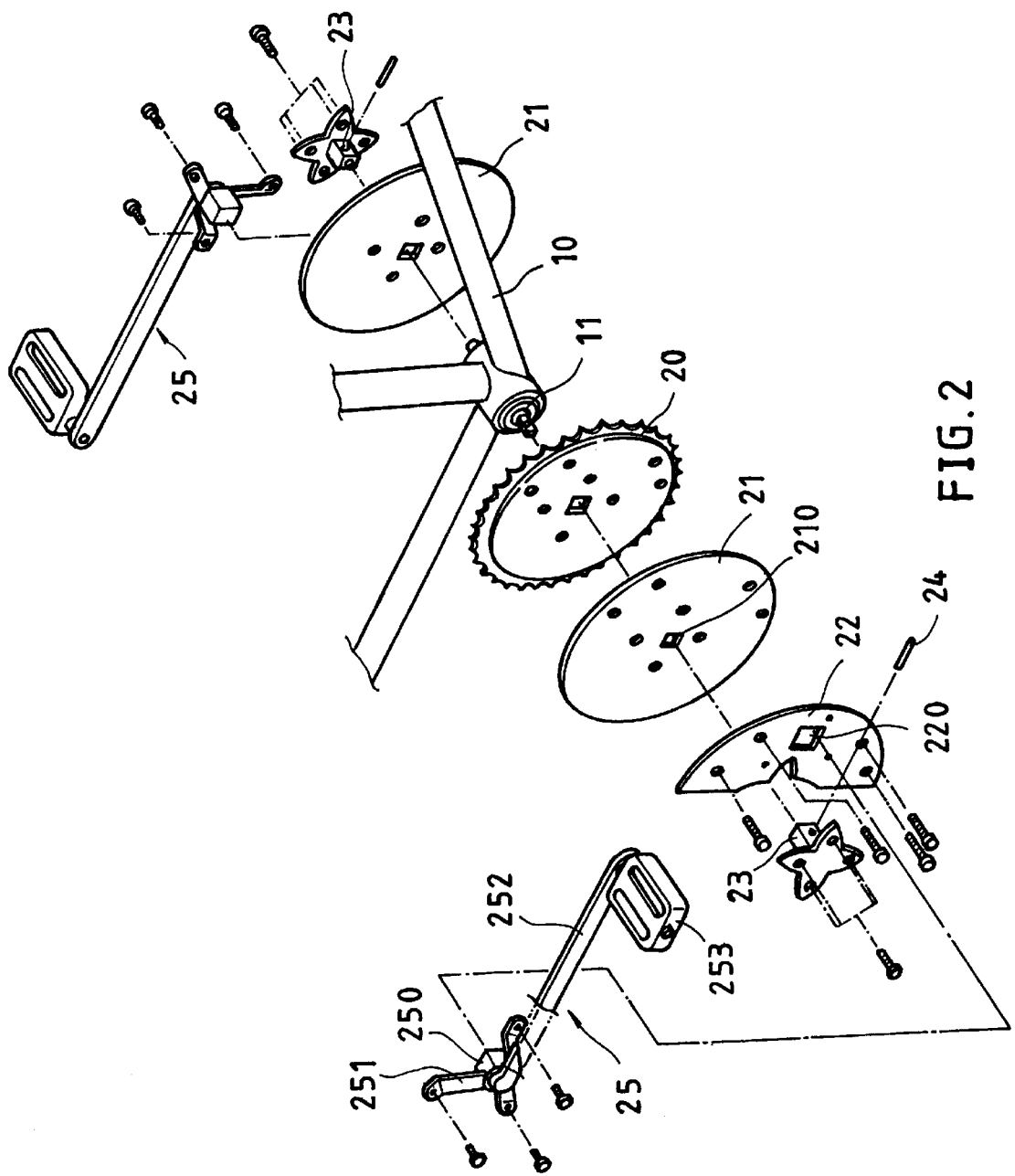
FIG. 2 is an exploded view of the present invention.
Figure 3:
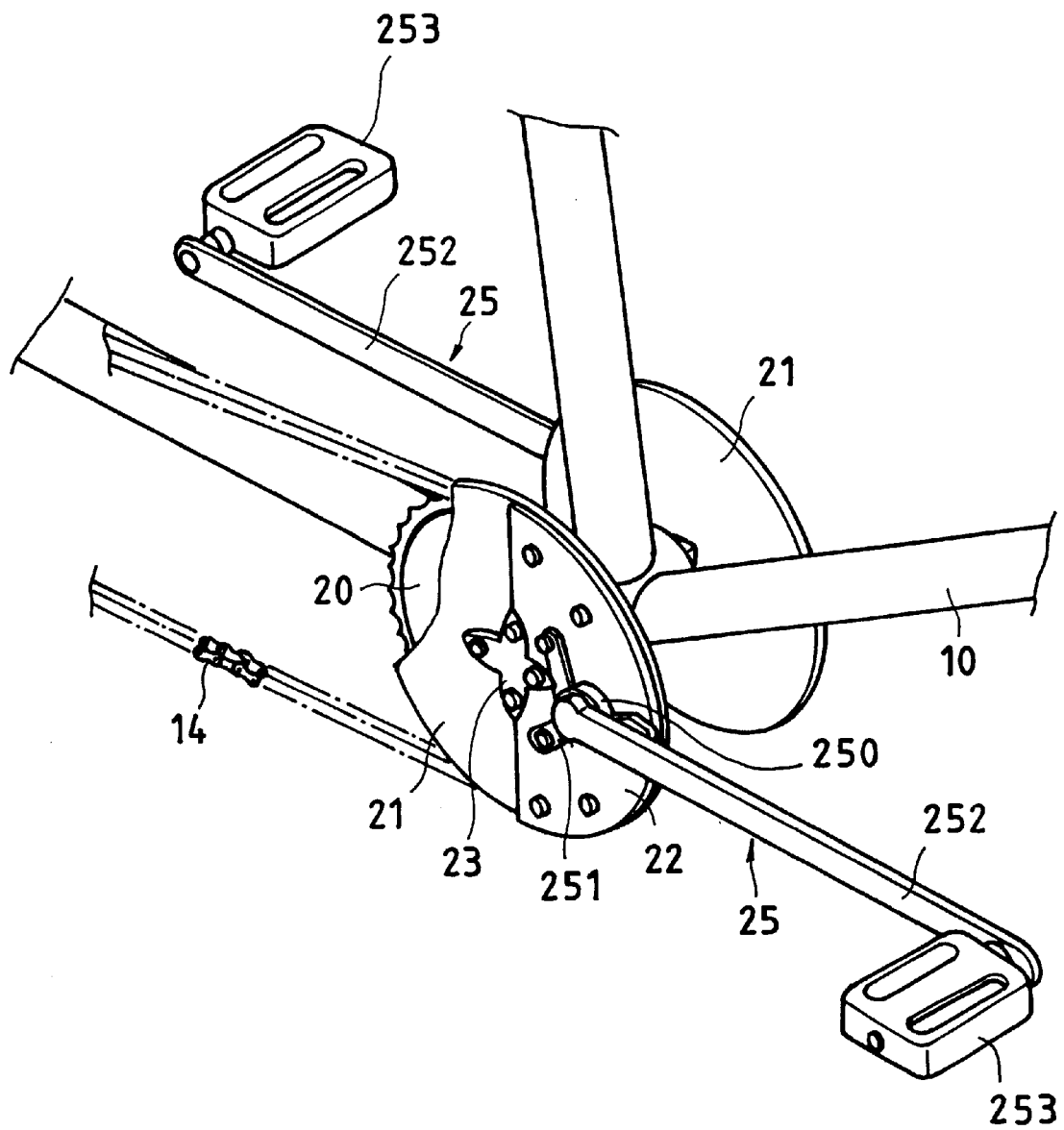
FIG. 3 is an assembly view of FIG. 2.
Figure 4:
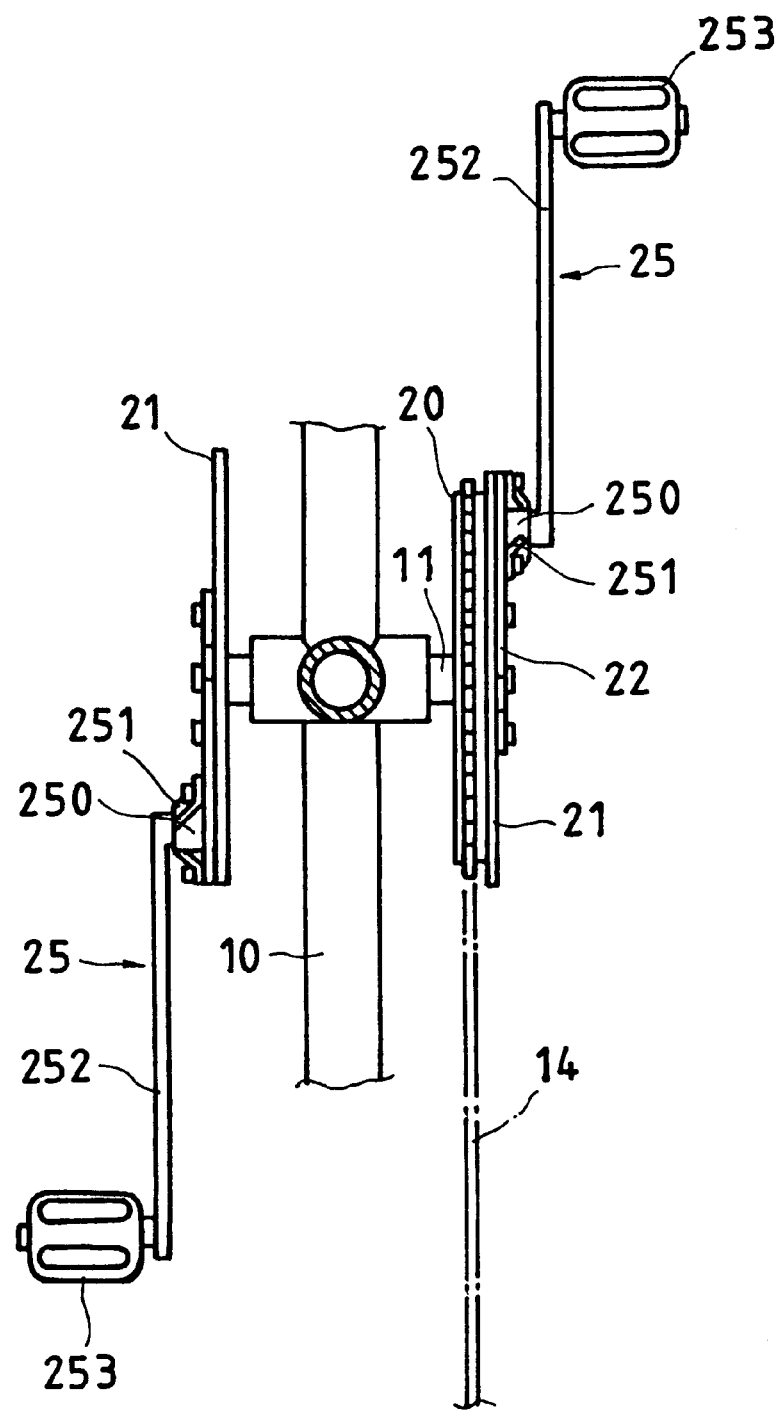
FIG. 4 is a plain view of the present invention.

Referring to FIGS. 2, 3 and 4, a bottom bracket bearing axle 11 is revolvably mounted in the bottom bracket of a bicycle frame 10, and a chain wheel 20 is mounted on one end of the bottom bracket bearing axle 11. Two wheel boards 21 are mounted on the ends of the bottom bracket bearing axle 11. Each wheel board 21 has a center hole 210. Two cap members 23 are respectively plugged into the center holes 210 on the wheel boards 21 and sleeved onto the ends of the bottom bracket bearing axle 11, and then fixedly secured to the bottom bracket bearing axle 11 by a respective lock pin 24 to secure the wheel boards 21 to the chain wheel 20 and the bottom bracket bearing axle 11. Two semi-circular flat-plate counter weights 22 are respectively reversely fastened to the wheel boards 21 at an outer side. Each flat-plate counter weight 22 has a coupling hole 220 near the periphery. Two pedal assemblies 25 are respectively coupled to the flat-plate counter weights 22. Each pedal assembly 25 comprises a crank 252, and a pedal 253 mounted on one end of the crank 252. The crank 252 of each pedal assembly 25 has a coupling block 250 at one end remote from the pedal 253, and three mounting lugs 251 equiangularly spaced around the coupling block 250. The coupling blocks 250 of the cranks 252 of the pedal assemblies 25 are respectively inserted into the coupling holes 220 on the flat-plate counter weights 22, then the mounting lugs 251 are fixedly fastened to the flat-plate counter weights 22 by for example screws. Because the pedal assemblies 25 are respectively coupled to the wheel boards 21 through the flat-plate counter weights 22 at eccentric locations, the wheel boards 21 can be turned with less effort. Because the wheel boards 21 are fixedly secured to the bottom bracket bearing axle 11, the chain wheel 20 is rotated to turn the chain 14 when the user pedals the pedal assembly 25 to turn the wheel boards 21 and the bottom bracket bearing axle 11.

Figure 5:
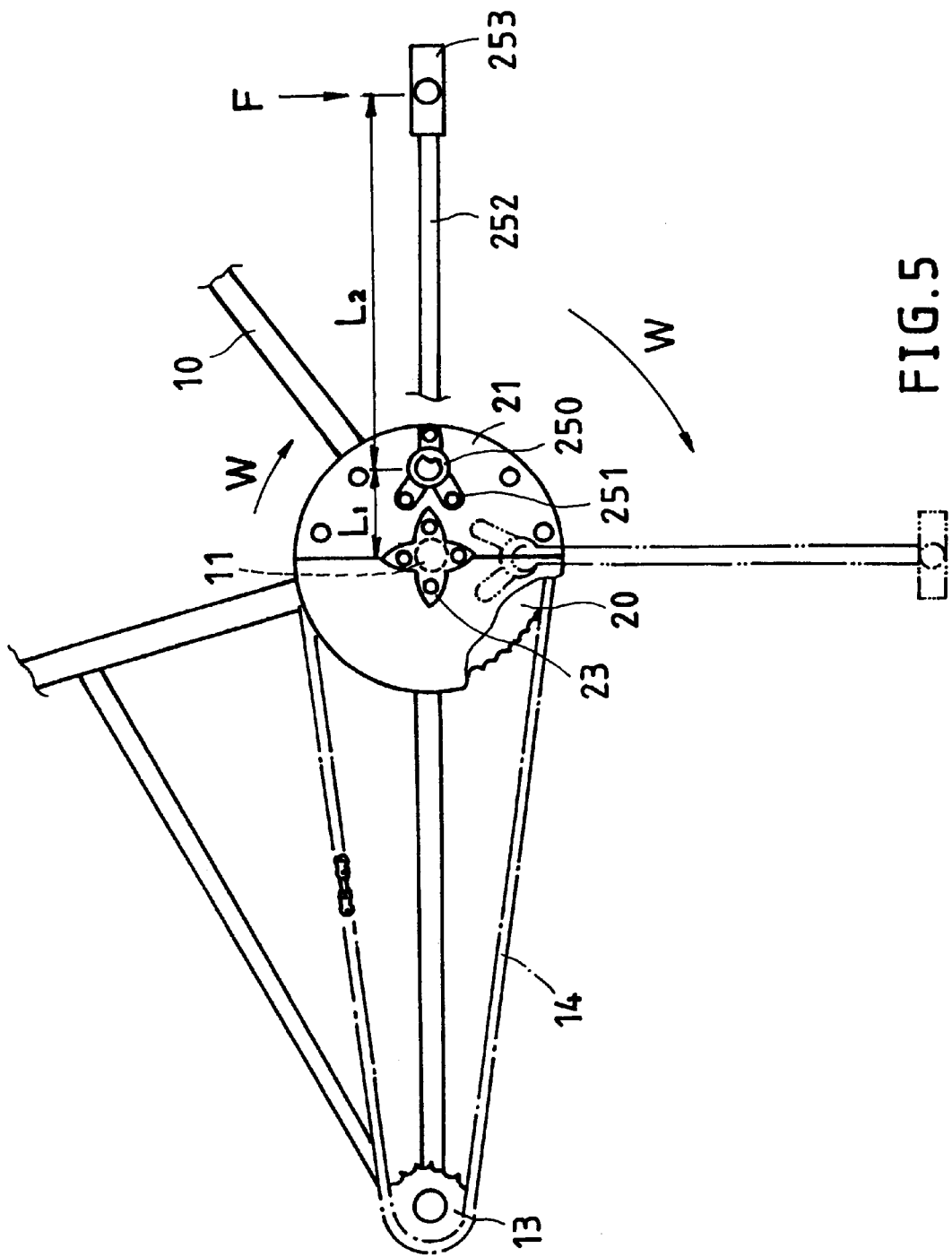
FIG. 5 is a schematic drawing showing the operation of the present invention.

Referring to FIG. 5, when a force F is applied to the pedal 253 of one pedal assembly 25, thus:

1. Because moment of force=force F×arm of force, prolonging the arm of force relatively increases the moment of force. The length L2 of the crank 252 is fixed. However because the crank 252 is coupled to the wheel board 21 at an eccentric location, there is a distance L1 between the central axis of the bottom bracket bearing axle 11 and the connecting point between the crank 252 and the wheel board 21. Therefore, the arm of force=L1+L2. Because the arm of force is longer than the length of the crank 252, less effort is needed to rotate the wheel board 21.

2. Because velocity V=radius of gyration R×angular velocity $\bar{\Omega}$, velocity V is relatively increased when the radius of gyration R is increased and the angular velocity $\bar{\Omega}$ is remained unchanged. Because the distance between the pedal 253 and the bottom bracket bearing axle 11 is L1+L2, the radius of gyration R is relatively increased, in consequence velocity V is relatively increased.

Furthermore, when the crank 253 is turned downwards from the up stroke to the down stroke, the flat-plate counter weight 22 accelerates the speed of rotation of the wheel board 21.

While only one embodiment of the present invention has been shown and described, it will be understood that various modifications and changes could be made thereunto without departing from the spirit and scope of the invention disclosed.

What the invention claimed is:

1. A bicycle pedal crank mounting arrangement comprising two wheel boards fixedly fastened to two opposite ends of a bottom bracket bearing axle of a bicycle, two cranks respectively coupled to said wheel boards, two pedals respectively mounted on said cranks at one end remote from said wheel boards and pedaled to rotate said wheel boards and said bottom bracket bearing axle, wherein two flat-plate counter weights are respectively fixedly fastened to said wheel boards at an outer side at an eccentric location in reversed direction; said cranks each have one end respectively fixedly fastened to said flat-plate counter weights, and an opposite end respectively connected to said pedals.

2. The bicycle pedal crank mounting arrangement of claim 1 wherein said flat-plate counter weights each have a coupling hole; said cranks each have a coupling block respectively plugged into the coupling holes on said flat-plate counter weights, and a plurality of mounting lugs equiangularly spaced around the respective coupling block and respectively fastened to said wheel boards by fastening elements.

* * * * *